United States Patent [19]

Müller et al.

[11] Patent Number: 5,295,912
[45] Date of Patent: Mar. 22, 1994

[54] RESILIENT SHAFT COUPLING DESIGNED AS A COMPOSITE PART AND METHOD OF PRODUCING IT

[75] Inventors: Karl-Heinz Müller, Wissen; Werner Hoffmann, Siegburg, both of Fed. Rep. of Germany

[73] Assignee: GKN Automotive AG, Siegburg, Fed. Rep. of Germany

[21] Appl. No.: 780,767

[22] Filed: Oct. 22, 1991

[30] Foreign Application Priority Data

Oct. 23, 1990 [DE] Fed. Rep. of Germany ....... 4033594

[51] Int. Cl.⁵ ................................................ F16D 3/78
[52] U.S. Cl. .......................................... 464/93; 464/98
[58] Field of Search ......................... 464/92-94, 464/96, 98, 99, 69

[56] References Cited

U.S. PATENT DOCUMENTS 1,482,571  2/1924  MacDonald ........................ 464/92
1,531,999  3/1925  Stokes ................................. 464/94
3,901,047  8/1975  Pletsch et al. .

FOREIGN PATENT DOCUMENTS 431457   7/1926  Fed. Rep. of Germany ........ 464/93
910611   5/1954  Fed. Rep. of Germany ........ 464/92
3041064  5/1982  Fed. Rep. of Germany .
3725957  3/1989  Fed. Rep. of Germany .

Primary Examiner—Daniel P. Stodola
Assistant Examiner—John Rollins
Attorney, Agent, or Firm—Harness, Dickey & Pierce

[57] ABSTRACT

A resilient shaft coupling includes a annular member constructed of a hexagonal resilient joint disc and at least one attaching element which includes a plurality of flange arms. The resilient joint disc includes attaching regions at its corners provided with axial connecting element bores. The straight sides of the joint disc are provided with thin web regions which permit elastic deformation.

16 Claims, 3 Drawing Sheets

RESILIENT SHAFT COUPLING DESIGNED AS A COMPOSITE PART AND METHOD OF PRODUCING IT

BACKGROUND AND SUMMARY OF THE INVENTION

The present invention, in general, relates to a resilient shaft coupling. More particularly, the present invention relates to such a shaft coupling which has a resilient annular member made of a fiber composite material and at least one attaching element which is intended to connect a shaft to the circumference of the annular member. The present invention further relates to a method of producing such a shaft coupling.

Previously, resilient shaft couplings have been disclosed which provide flanges used for attachment to a resilient joint disc with bolts. Such a technique inherently results in relatively lengthy assembly procedures. Additionally, relatively large amounts of material are required.

German patent DE 30 41 064 A1 describes a resilient annular member constructed of a fiber composite material having individual attaching elements, in the form of bolts, formed into the annular member during the course of production. The annular member, which is produced from so-called prepregs has a torus-like shape with the bolts projecting outwardly at both end faces. The annular member further has attaching elements, such as flanges, which are threaded on in a manner well-known in the art in order to connect a shaft. The annular member is produced through a complicated process utilizing a core which is melted. As compared to the conventional method of threading on flanges, assembly procedures are not simplified.

U.S. Pat. No. 3,901,047 discloses a resilient vibration damper disposed between adjacent attaching flanges directed towards each which are to be connected to each other by way of a resilient annular member. The annular member, in this case, consists of a rubber-elastic material which is held by an attaching element so as to be embraced on its outside.

Neither of the above-discussed devices is without its problems. For example, German Patent DE 30 41 064 A1 fails to teach a simplified assembly procedure, as compared to the conventional method of threading on flanges. U.S. Pat. No. 3,901,047 discloses a coupling in which a nonrotating connection between the annular member and attaching element is ensured only in those cases where additional connecting means penetrate both elements which, such as in the form of through-sleeves for bolts, while at the same time serving to secure adjoining shafts or the like.

It is an object of the present invention to provide a resilient shaft coupling constructed of a simple material which comprises a cost-effective connection between the flange and annular member.

It is another object of the present invention to provide a resilient shaft coupling which is able to withstand high torque loads.

The present invention is directed to overcoming the aforementioned problems associated with resilient shaft couplings, wherein it is desired to provide at least one attaching element unitarily formed and including several flange arms. Further, the resilient annular member constitutes a polygonous joint disc formed into the flange arms of the attaching element in such a manner that they fully enclose the connecting regions of the joint disc. By introducing these measures it is possible to provide a resilient shaft coupling in the case of which the resilient coupling or connecting disc and at least one attaching element are joined to the attaching means required for connecting a shaft in one single operation to form a composite part.

Such resilient joint discs are already known in a similar form from DE 37 25 957 A1. Such joint discs are made of so-called prepregs for example and represent elements capable of transmitting high torques while being very flexible in respect to axial displacements and changes in the angles of the axes. Such joint discs are normally polygonous (having a closed plane figure bounded by 3 or more line segments) while comprising connecting regions reinforced at corners for receiving through-bores, whereas the connecting web regions are more resilient and delineated at right angles relative to their longitudinal axis, thereby achieving relatively undisturbed deformability.

Depending on the type of load, the arrangement of the fibers in the joint disc may vary, with the fibers in the central plane extending in the longitudinal direction of the webs. In the outer layers the fibers may be arranged at an angle or crosswise relative to the longitudinal axis of the webs.

The present invention makes it possible in an advantageous way to simplify the connection with the attaching element by carrying out the respective forming operation, with the movability of the webs not being restricted in any way by forming the flange arms. In a preferred embodiment, the flange arms fully enclose the connecting regions of the joint disc. To retard the development of any weak resultant from cracks in the joint disc enclosure formed by the flange fingers, it is proposed to form additional axial webs inside the joint disc on to the flange arms. Preferably, the axial webs taper radially outwardly and are interconnected by radial or circumferential ribs. In particular, an improved form-fitting connection may be obtained in that the fixing holes provided in joint discs of the prior art design are retained and, during the connecting operation, are filled by plugs of material of the flange arms. An improved form-fitting connection is also achieved if projecting pins are pressed or threaded into the existing fixing holes. The connecting pins are then enclosed by the material of the flange arms. In this way it is possible to produce a connection which can be subjected to high loads, especially also under torque conditions.

Improved load conditions in the joint disc by superimposing tensile and bending forces are obtained in those cases where the fixing holes, with reference to the longitudinal center lines of the web regions, are offset radially inwardly.

The material for the attaching element could be any suitable injectable, formable or kneadable material. Preferably, such a material will be plastic, possibly with portions of short fibers such as they are used in the form of thermoplastics in injection molding processes. However, it is also possible to sinter granulates in the case where the pre-manufactured joint disc is inserted into a suitable mold and subsequently enclosed by the attaching element to be finish-formed. Such a sintered attaching element may also contain metallic parts or be fully metallic if the material of the joint disc permits such a method.

In a preferred embodiment, the joint shaft is designed as a hexagonal ring. Provided are three flange arms offset by 120°, with the attached element additionally comprising a tubular sleeve which may be connected to an adjoining shaft through a pressed or glued connection.

Normally, three fixing points will remain free so as to be circumferentially offset relative to the flange arms and may be bolted to a second attaching element having a similar configuration.

If it is not required that the resilient shaft coupling has releasable disconnecting regions, it is advantageous if both sides of the resilient joint disc are associated with a formed-on attaching element having flange arms circumferentially offset relative to each other.

BRIEF DESCRIPTION OF THE DRAWINGS

The various advantages of the present invention will become apparent to those skilled in the art after reading the following specification and by reference to the drawings in which.

DETAILED DESCRIPTION OF THE DRAWINGS

Figure 1:
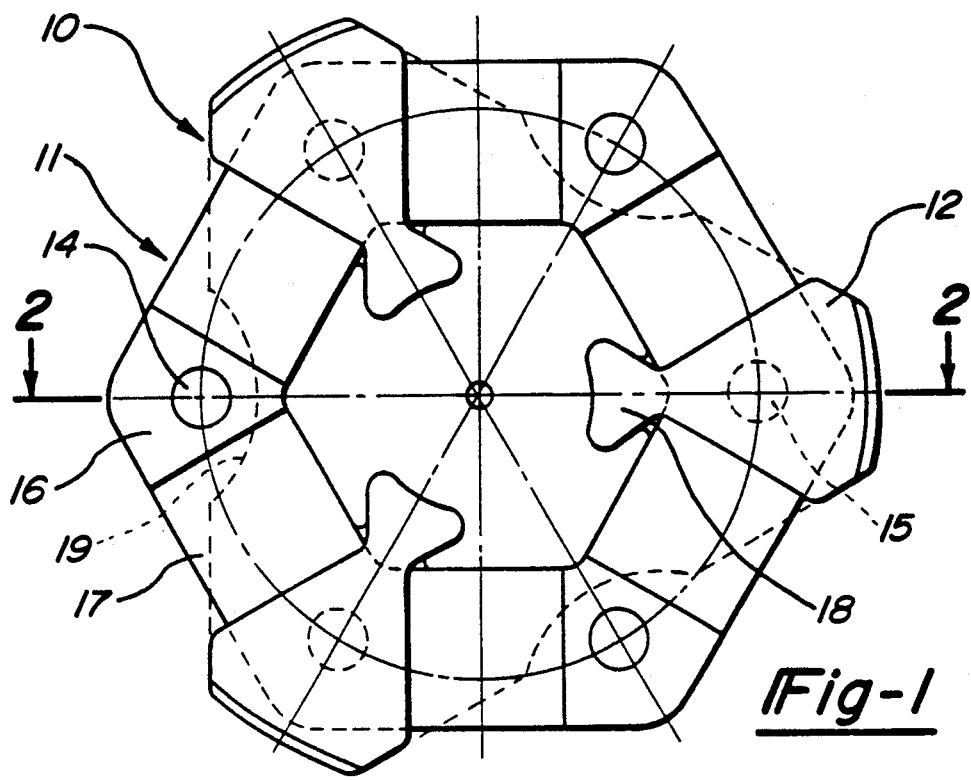
FIG. 1 is an axial view of the preferred embodiment of the resilient shaft coupling of the type to which the present invention pertains.
Figure 2:
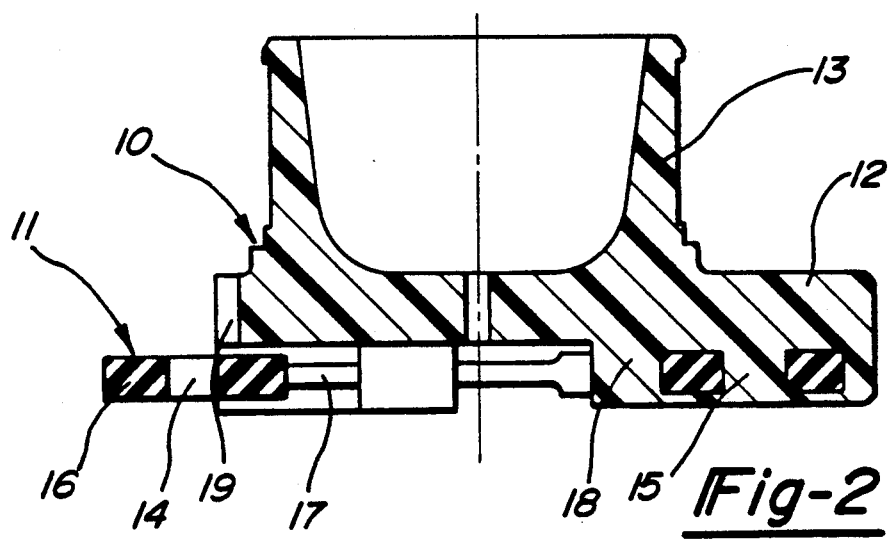
FIG. 2 is a sectional view taken through the line 2—2 of FIG. 1.

Turning to FIGS. 1 and 2, the resilient shaft coupling of the present invention substantially consists of an attaching element 10 produced from a formable or injectable material and of a hexagonal resilient joint disc 11 produced from fiber-reinforced plastics. At its corners, the resilient joint disc 11 includes attaching regions 16 whose thickness is reinforced. The attaching regions 16 are further provided with axial connecting element bores 14. The straight sides of the resilient joint disc 11 are provided with thin web regions 17, in which elastic deformation is permitted.

Three of the thickened attaching regions 16 are associated with flange arms 12. The flange arms 12 offset relative to each other by 120°. In the regions of the flange arms 12, the resilient joint disc 11 is molded in as a composite part. To reinforce the enclosure, inwardly widening axial webs 18 are formed on to the inside of the flange arms 12. Recesses 19 are provided between adjacent flange arms 12 in order to create space for securing means at the free connecting element bores 14. An axially extending tubular sleeve 13 is connected so as to be integral with the flange arms 12. The tubular sleeve 13 is provided for connection to a hollow shaft (not illustrated), such as a driveshaft.

In the region of the flange arms 12, the connecting element bores 14 of the resilient joint disc 11 accommodate form-fitting material plugs 15 formed of the material of the attaching elements 10.

Figure 3:
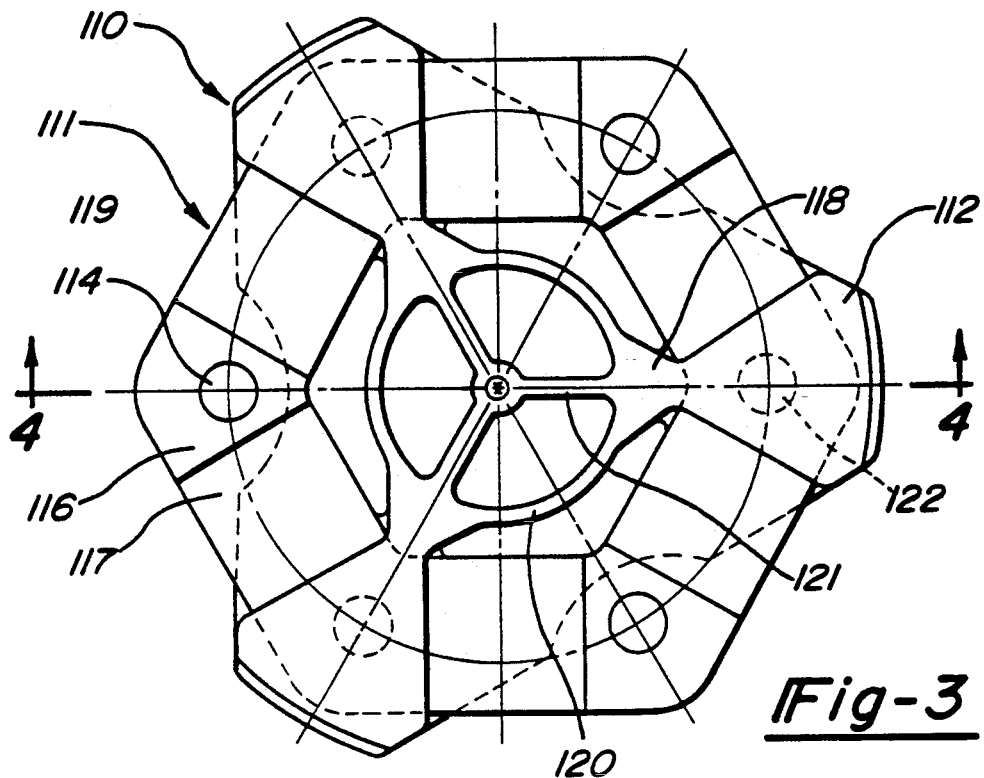
FIG. 3 is an axial view of an alternative embodiment of the resilient shaft coupling of the type to which the present invention pertains.
Figure 4:
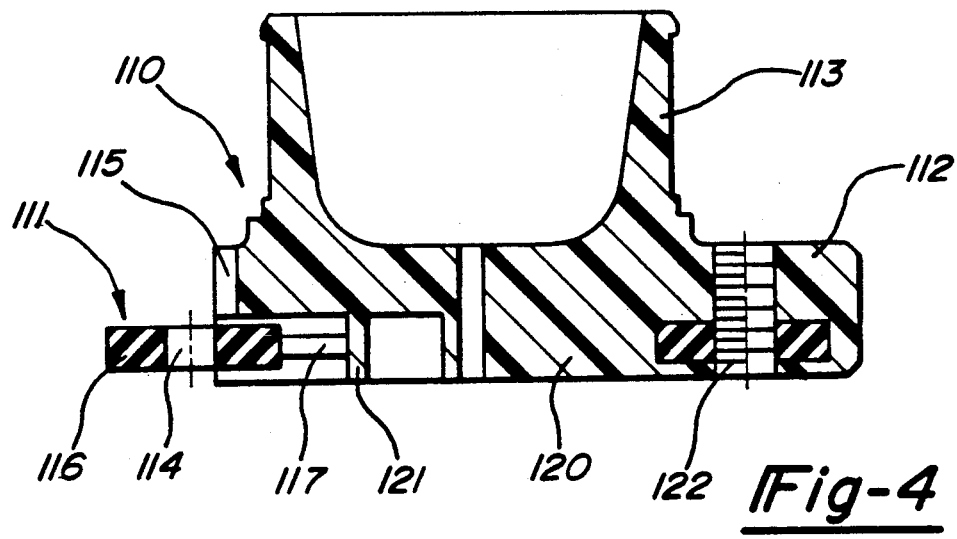
FIG. 4 is a sectional view taken through the line 4—4 of a resilient shaft of FIG. 3.
Figure 5:
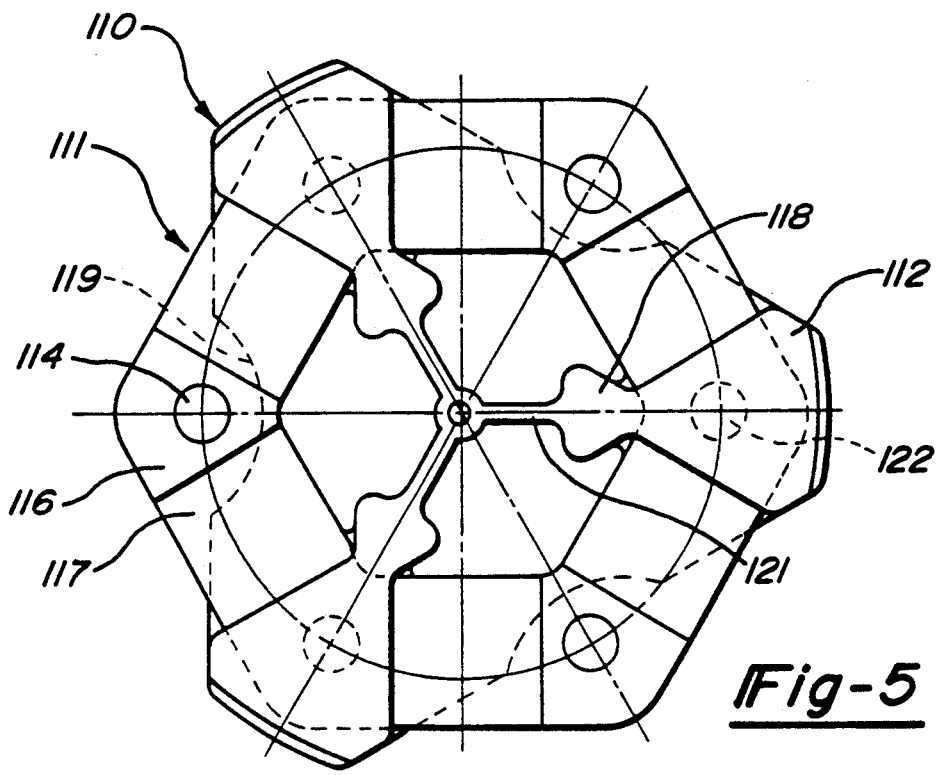
FIG. 5 is an axial view of an alternate embodiment of the resilient shaft coupling showing radial webbing.
Figure 6:
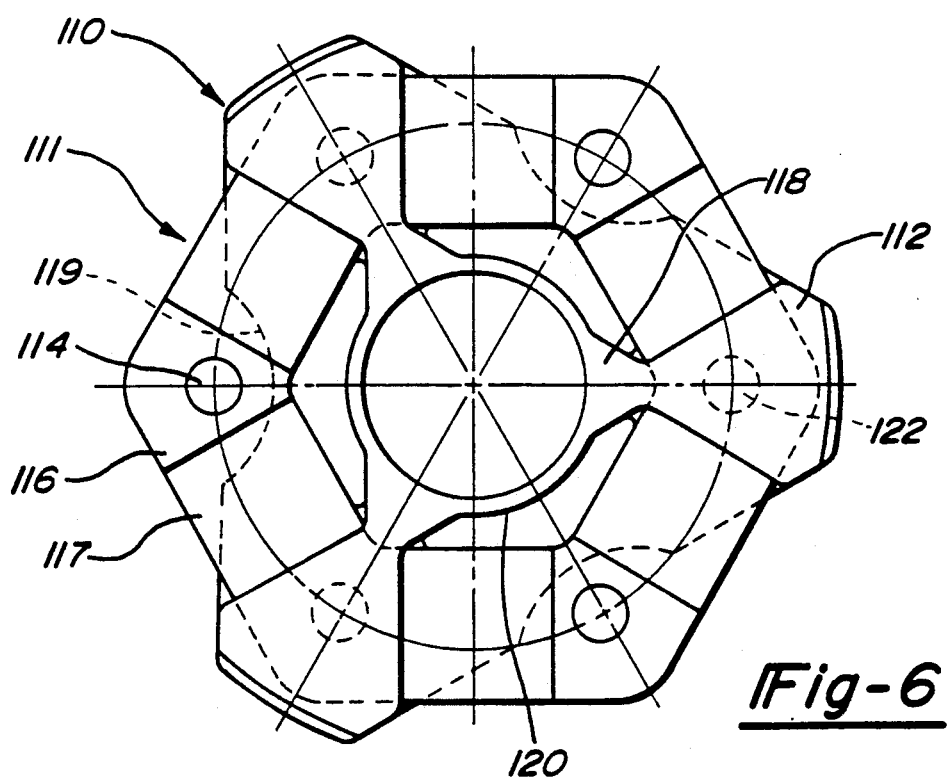
FIG. 6 is an axial view of an alternate embodiment of the resilient shaft coupling showing circumferential webbing.

Referring next to FIGS. 3 and 4, an alternative embodiment of the resilient shaft coupling of the present invention substantially comprises the same details as the shaft coupling shown in FIGS. 1 and 2. Corresponding details having been provided with given reference numbers increased by 100.

In contrast to FIGS. 1 and 2, the axial webs 118 of the alternative embodiment are interconnected through annular webs 120 and a radial web 121, thereby reinforcing the axial webs. Steel pins 122 ensuring an improved form-fitting connection, are inserted into the attaching regions 116 molded into the flange arms 112.

The method of producing the resilient shaft coupling of the present invention consists of inserting the resilient joint disc 11, 111 into a molding/forming tool in such a way so that the attaching element 10, 110 consisting of an injectable or formable material, with its flange arms 12, 112, may be injected or pressed at the three attaching regions 16, 116 which are offset relative to each other by 120°. Such a connection between the resilient joint disc 11, 111 and the attaching element 10, 110 is completely clearance-free, and any out-of-balance problems are negligible.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A resilient shaft coupling comprising:
    a fiber reinforced resilient annular member comprising a joint disc with web regions and connecting regions, circumferentially alternating around said annular member;
    at least one homogenous attaching element for connecting a shaft to the circumference of said annular member, the at least one attaching element having a plurality of integral flange arms; and wherein said resilient annular member is formed into the flange arms of the attaching element so as to fully enclose the connecting regions of the joint disc at the flange arms.

2. The resilient shaft coupling of claim 1 in which the resilient joint disc is provided with a plurality of attaching element bores.

3. The resilient shaft coupling of claim 2 further including a plurality of pins disposed within the attaching element bores.

4. The resilient shaft coupling of claim 2 further including a plurality of material plugs disposed with the attaching element bores.

5. The resilient shaft coupling of claim 2 in which the attaching element bores are provided in alternating flange arms circumferentially around the resilient joint disc.

6. The resilient shaft coupling of claim 1 in which each side of the resilient joint disc is associated with an attaching element having flange arms which are offset relative to each other in the circumferential direction.

7. The resilient shaft coupling of claim 6 including three flange arms disposed 120° circumferentially around the resilient joint disc relative to each other.

8. The resilient shaft coupling according to claim 7 wherein the flange arms enclose the connecting regions so that the web regions not enclosed are delimited at right angles relative to their longitudinal axis.

9. The resilient shaft coupling of claim 1 wherein the attaching element is constructed of metal.

10. The resilient shaft coupling of claim 1 wherein the joint disc is polygonous, and the joint disc and flange arms are connected at the corner points.

11. The resilient shaft coupling of claim 1 wherein the attaching element is constructed of plastic.

12. A resilient shaft coupling comprising:
a fiber reinforced resilient annular member comprising a joint disc with web regions and connecting regions, circumferentially alternating around said annular member;
at least one unitary attaching element for connecting a shaft to the circumference of said annular member, the at least one attaching element having a plurality of flange arms;
wherein said resilient annular member is formed into the flange arms of the attaching element so as to fully enclose the connecting regions of the joint disc;
wherein the disc joint is polygonous and the joint disc and flange arm are connected at the corner points; and
a plurality of axial webs connected to the flange arms respectively, said axial webs disposed radially inside the resilient joint disc and tapering radially outward.

13. The resilient shaft coupling of claim 12 wherein the axial webs are interconnected by a circular rib.

14. The resilient shaft coupling of claim 12 wherein the axial webs are interconnected by radial ribs.

15. A method of producing a resilient shaft coupling including a resilient joint disc and attaching element comprising:
providing a resilient joint disc; and
molding a homogenous attaching element having a plurality of flange arms so that said flange arms completely surround at least a portion of said joint disc.

16. A resilient shaft coupling comprising:
a fiber reinforced resilient annular member comprising a joint disc with web regions and connecting regions, circumferentially alternating around said annular member;
at least one homogenous attaching element for connecting a shaft to the circumference of said annular member, said at least one attaching element having a plurality of flange arms integrally formed with said homogenous unitary attaching element;
wherein said resilient annular member is molded into the flange arms of the attaching element during the molding of the attaching element so as to capture the annular member within said flange arm.

* * * * *